(12) United States Patent
Cardin

(10) Patent No.: US 11,906,489 B2
(45) Date of Patent: Feb. 20, 2024

(54) AUTOSAMPLER

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 0 days.

(21) Appl. No.: 17/190,120

(22) Filed: Mar. 2, 2021

(65) Prior Publication Data

US 2021/0270783 A1   Sep. 2, 2021

Related U.S. Application Data

(60) Provisional application No. 62/984,130, filed on Mar. 2, 2020.

(51) Int. Cl.
*G01N 30/24* (2006.01)
*G01N 30/18* (2006.01)

(52) U.S. Cl.
CPC ............ *G01N 30/24* (2013.01); *G01N 30/18* (2013.01)

(58) Field of Classification Search
CPC .... G01N 30/18; G01N 30/24; G01N 35/0099; G01N 35/109; G01N 35/1095; G01N 2203/0256; G01N 2030/009
See application file for complete search history.

(56) References Cited

U.S. PATENT DOCUMENTS

| 4,944,781 A | 7/1990 | Ruggirello et al. |
| 5,187,972 A * | 2/1993 | DeFriez ............. G01N 33/0011 73/29.02 |

(Continued)

FOREIGN PATENT DOCUMENTS

| EP | 0306307 A2 | 3/1989 |
| EP | 1936384 A1 * | 6/2008 ............... G01N 1/34 |

(Continued)

OTHER PUBLICATIONS

International Search Report received for PCT Patent Application No. PCT/US2021/070219, dated May 28, 2021, 4 pages.

*Primary Examiner* — John Fitzgerald
*Assistant Examiner* — Truong D Phan
(74) *Attorney, Agent, or Firm* — Kubota & Basol LLP

(57) ABSTRACT

Embodiments of the disclosure relate to chemical analysis systems, including autosampler systems. In some embodiments, an autosampler system can analyze gas phase samples using a single inlet for better consistency. The autosampler system can move the sample container closer to the sample introduction/preconcentration system prior to accessing the contents of the container to reduce exposure of the sample to reactive surfaces. The autosampler system is able to couple the sample containers to a sampling wand automatically, thereby eliminating the need to pre-attach each container using a gas transfer line. The autosampler system can be disposed on top of a chemical analysis system (e.g., a GC or GCMS), thereby conserving laboratory bench space. In some embodiments, the modules (e.g., sample trays, thermal conditioning systems, support legs) of the autosampler system can be coupled to the autosampler system using clamps that include magnetic codes associated with autocalibration information.

15 Claims, 12 Drawing Sheets

(56) References Cited

U.S. PATENT DOCUMENTS

| | | | |
|---|---|---|---|
| 5,301,261 A | 4/1994 | Poole et al. | |
| 5,721,384 A | 2/1998 | Tanihata | |
| 5,948,360 A | 9/1999 | Rao et al. | |
| 5,998,217 A | 12/1999 | Rao et al. | |
| 6,442,995 B1 | 9/2002 | Van | |
| 6,973,846 B2 | 12/2005 | Bremer et al. | |
| 7,178,414 B1 | 2/2007 | Kokosa | |
| 9,869,688 B2 | 1/2018 | Bremer et al. | |
| 10,816,516 B2 | 10/2020 | Tolley et al. | |
| 2001/0024624 A1 | 9/2001 | Schmidt et al. | |
| 2002/0110902 A1 | 8/2002 | Prosser et al. | |
| 2007/0269853 A1 | 11/2007 | Galiano | |
| 2008/0296491 A1* | 12/2008 | Hannigan | H01J 49/40 250/287 |
| 2010/0129789 A1* | 5/2010 | Self | B01L 9/06 700/214 |
| 2014/0190271 A1* | 7/2014 | Braun | G01F 15/08 73/861.04 |
| 2014/0302610 A1 | 10/2014 | Blouin et al. | |
| 2015/0309064 A1 | 10/2015 | Rose | |
| 2019/0137526 A1* | 5/2019 | Cole | G01N 35/0099 |
| 2020/0355650 A1 | 11/2020 | Kimoto et al. | |
| 2021/0010981 A1 | 1/2021 | Kimoto | |

FOREIGN PATENT DOCUMENTS

| | | |
|---|---|---|
| JP | H04-36460 U | 3/1992 |
| JP | H04-83159 A | 3/1992 |
| JP | H10-502733 A | 3/1998 |
| JP | 4653286 B2 | 3/2011 |
| JP | 2015-190985 A | 11/2015 |
| JP | 2019-518947 A | 7/2019 |
| JP | 2020-51853 A | 4/2020 |
| KR | 20010072569 A * | 7/2001 |
| WO | 1995/008774 A2 | 3/1995 |

* cited by examiner

An autosampler system comprising:

A sampling platform

An x-axis rail

A y-axis rail

A z-axis rail

A pickup tool coupled to one or more motors configured to traverse the x-axis rail, the y-axis rail, and the z-axis rail, wherein the pickup tool is configured to move a sample container from a sample tray to the sampling platform A sample wand configured to draw a known mass of a gas sample having a volume in the range of 1-2500cc from the sample container without addition of another gas into a sample preconcentrator using a mass flow controller or vacuum reservoir, wherein the pickup tool is further configured to move the sample wand to the sample container, and wherein the gas sample is at a pressure that is greater than, less than, or equal to atmospheric pressure while contained in the sample container A chemical analysis device fluidly coupled to the sample preconcentrator

FIG. 7

AUTOSAMPLER

CROSS-REFERENCE TO RELATED APPLICATION

This application claims the benefit of U.S. Provisional Patent Application No. 62/984,130, filed on Mar. 2, 2020, the entire disclosure of which is incorporated herein by reference in its entirety for all purposes.

FIELD OF THE DISCLOSURE

This relates to an autosampler and, more particularly, to a rail-based autosampler configured to prepare samples for analysis by gas chromatography and/or gas chromatography-mass spectrometry.

BACKGROUND OF THE DISCLOSURE

Rail-based autosamplers can be used to introduce samples into a GC or GCMS. These systems have been mostly used for analysis of liquid and solid samples contained in vials, primarily using syringes to access the liquid or gas phase headspace within the vial through a rubber septum for injection into a GC. These rail autosamplers have also been used to analyze the headspace of samples use a SPME fiber inside of a syringe needle to adsorb the headspace onto the fiber, or by dynamically pushing the contents of the headspace within a vial through a sorbent to concentrate the volatile fraction of the sample. However, there are at least three limitations of these autosamplers.

First, prior rail-based autosamplers did not lend themselves to the analysis of gas sampling containers for analysis of volatile organic compounds both due to the inability to handle quantitative sample volume measurement of sample containers at both positive and negative pressures, and because they could not manage the transfer of organic compounds without losses of many chemical species during the process. Some rail autosamplers have no way to transfer the contents of large volumes of these containers to sample preconcentration systems designed to concentrate organic compounds of interest while eliminating the air and water vapor from the sample prior to GC injection. The problem has been in managing containers in the 50 cc to 2500 cc range, while drawing anywhere from 1 to 1000 cc from each container, which is well beyond the usable volume range of glass syringes. In addition, these containers are often above or below atmospheric pressure, making a standard syringe incapable of properly measuring the mass of sample withdrawn from these containers during analysis.

A second major problem with prior rail autosamplers has been the ability to automate the calibration process, and then confirm that the calibration has not changed prior to running a series of samples. Rail autosamplers consist of at least 3 axes (X, Y, and Z) to move the sample access point to each sample position, and then often a $4^{th}$ axis to operate a syringe to withdraw a portion of sample into the syringe for delivery to a GC for analysis. Rail autosamplers can be calibrated manually. However, manual calibration has some major disadvantages. First, it takes some training and time on the part of the analyst to perform the calibration. Second, if any module is shifted and/or moved after the calibration, the rail may be unable to locate the sample vials upon initiation of a sample sequence. These errors can cause damage to the syringe device and loss of valuable analysis time. Third, if the mounting points of the rail itself are shifted prior to analysis, the autosampler may be unable to access targets such as the GC injector that are connected to the GC and not the rail, which can cause the system to malfunction until a recalibration can be performed.

A third limitation of prior rail autosamplers is the use of long transfer lines when analyzing samples held in large sample containers. These transfer lines can be necessary in prior autosampler systems in order to deliver the samples from the large sample containers to the sample preconcentration unit and/or chemical analysis device. The use of these transfer lines can reduce compound recovery and increase the potential for carryover from one sample to another, thus reducing the accuracy of the analysis results.

Non-rail based robotic systems were created in the past that analyzed gas samples, but had major disadvantages. These systems included relatively long transfer lines, so transfer line losses and contamination potential were higher. These autosamplers consumed a lot of bench space in the laboratory, and therefore were more expensive and less practical for laboratories. Moreover, non-rail based autosamplers are typically more difficult to support, due to the difficulty in getting to active components within the autosampler enclosure.

SUMMARY OF THE DISCLOSURE

This relates to an autosampler and, more particularly, to a rail-based autosampler configured to prepare samples for analysis by gas chromatography and/or gas chromatography-mass spectrometry. In some embodiments, the autosampler system can include a sampling platform, an x-axis rail, a y-axis rail, a z-axis rail, a pickup tool, a sampling wand, and a chemical analysis device fluidly coupled to the sampling wand. The pickup tool can be coupled to a motor configured to traverse the x-axis rail, y-axis rail, and z-axis rail to enable the pickup tool to manipulate sample containers and the sampling wand of the autosampler system, for example. In some embodiments, once the pickup tool has moved a sample container to a sampling platform located proximate to the sampling wand, the pickup tool can couple the sampling wand to the sample container to extract a sample using, for example, a mass flow controller or a vacuum reservoir.

BRIEF DESCRIPTION OF THE DRAWINGS

FIG. 7 illustrates an autosampler system.

DETAILED DESCRIPTION

Figure 1A:
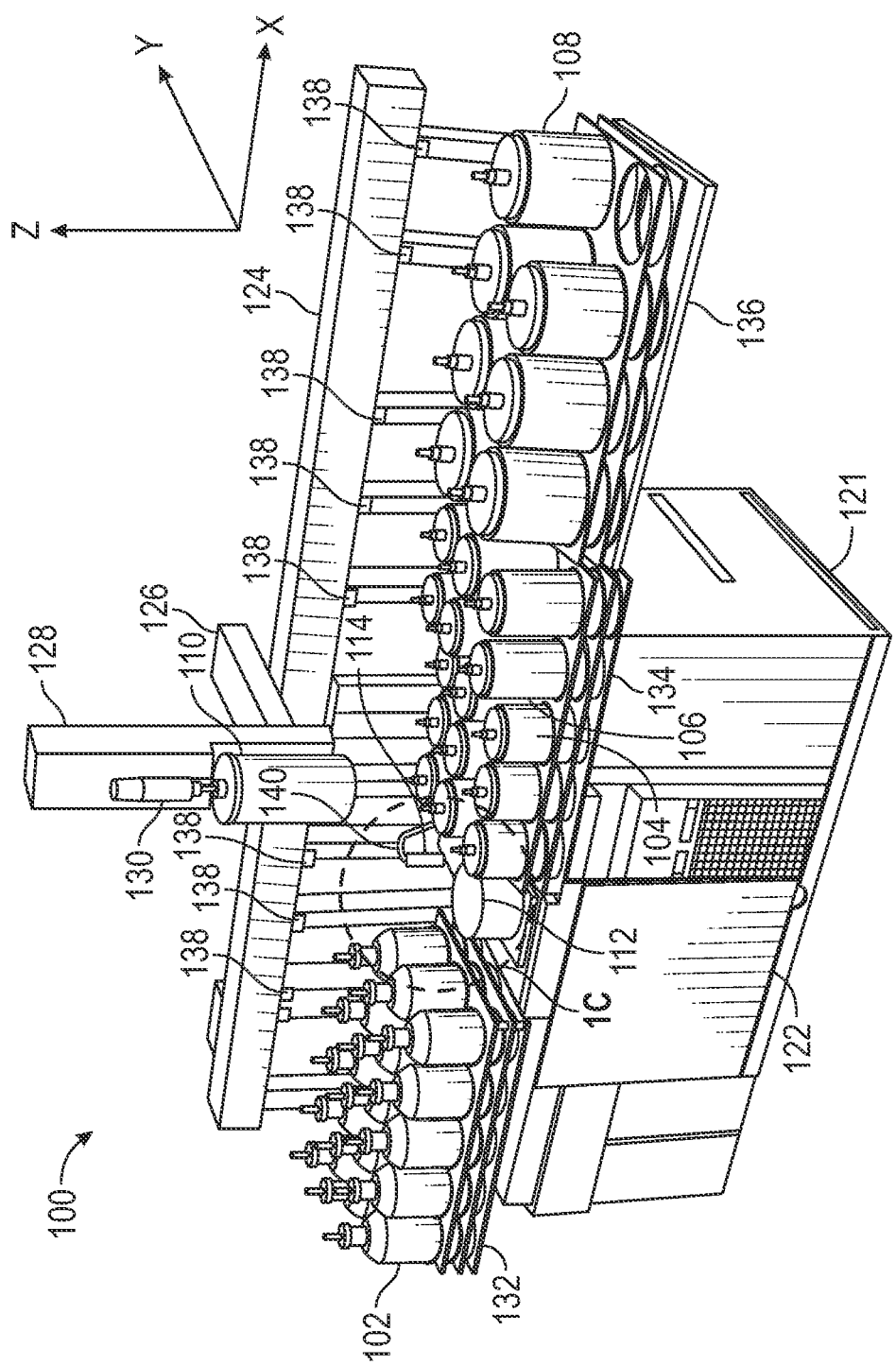
FIGS. 1A-1C illustrate an exemplary autosampler system according to some embodiments of the disclosure.

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

Introduction

This relates to an autosampler and, more particularly, to a rail-based autosampler configured to prepare samples for analysis by gas chromatography and/or gas chromatography-mass spectrometry. In some embodiments, the autosampler system can include a sampling platform, an x-axis rail, a y-axis rail, a z-axis rail, a pickup tool, a sampling wand, and a chemical analysis device fluidly coupled to the sampling wand. The pickup tool can be coupled to a motor configured to traverse the x-axis rail, y-axis rail, and z-axis rail to enable the pickup tool to manipulate sample containers and the sampling wand of the autosampler system, for example. In some embodiments, once the pickup tool has moved a sample container to a sampling platform located proximate to the sampling wand, the pickup tool can couple the sampling wand to the sample container to extract a sample using, for example, a mass flow controller or a vacuum reservoir.

Embodiments of the disclosure relate to GC (gas chromatography) and GCMS (gas chromatography-mass spectrometry) sample introduction. In some embodiments, the rail autosampler presented herein can analyze samples from gas sampling containers by using a moveable wand inlet that can attach to the gas sampling container to deliver the sample to a preconcentration device for preparing the sample for analysis by GC or GCMS. The preconcentration unit can draw a known volume out of the gas sampling container without having to introduce a gas to pressurize the contents into the preconcentration system. This rail autosampler can be positioned on top of the GC or GCMS to substantially save laboratory bench space. In some embodiments, the system includes unique magnetic identifications built into the clamps that attach the sample trays, preconcentration modules, sample cleaning modules, or other devices. The magnetic identifications allow for automatic calibration of the rail autosampler (e.g., for determination of X, Y, and/or Z coordinates of target locations) during system installation or modification in some embodiments. Also, the magnetic identifications can verify that no previously calibrated modules or sample trays nor the positioning of the rail relative to the GC mounts have changed since the last calibration event.

In some embodiments, an autosampler can pick up sample containers and move them to a sampling position of the system, thereby reducing the transfer line distance between the sample container and the sample preconcentration system during preconcentration. In some embodiments, the sample containers have volumes in the range of 10 cc to 2500 cc and diameters over 5 inches (e.g., 12.7 centimeters), which is an improvement over the capability of previous autosamplers that were only able to pick up sample containers with diameters in the 1-2 inch (e.g., 2.5-5 centimeters) range.

The system further includes a sample wand managed by the Z-axis of the rail that is used to access the contents of the sample container for analysis in some embodiments. The wand can connect to a heated transfer line through a side port that delivers the sample to a trapping system. In some embodiments, bringing the sample container close to the sample preparation system and then using a moveable wand with a very short heated line to the GC inlet or preconcentration/focusing system can improve analyte recovery and reduce system carryover by reducing the total exposure to surfaces outside of the gas chromatograph. In some embodiments, the sample wand can extract a sample from the sample container without introducing an additional gas into the system while extracting the sample.

In some embodiments, an autosampler uses magnetic identification clamps to automate calibration of the autosampler prior to use. It is important to calibrate the autosampler before processing samples so the autosampler is able to find the sample containers, the sampling platform where the containers will be placed during gas sampling, and the location of the gas sampling wand and additional gas calibration and internal standard ports. In some embodiments, the X-axis rail encoder remembers where each reference point (e.g., magnetic identification clamp) is located, and is able to find the remaining locations associated with the reference point. For example, a given module or tray platform will have a relative distance of displacement in the X and Y directions from an initial manually placed target (e.g., a sample container placed in the tray during calibration) such that these additional locations (vials on a tray) can be found.

In some embodiments, the magnetic identification clamps disclosed herein provide a way of mounting both the trays and modules to the X Axis of the autosampler, as well as the supports of the autosampler to the GC. The magnetic identifications provide a binary ID code for the respective clamps, allowing the identification code and the X Axis coordinate of the respective clamp identification to be referenced and saved by the system, for example. In some embodiments, the magnetic identifications facilitate calibration of a large number of autosampler modules, providing a relatively accurate determination of fine adjustment "targets" on the modules for subsequent fine tuning of the X, Y coordinates during calibration. The rail system can sweep across the (e.g., X-axis) rail locating clamps with identification codes and reading the identification codes, and determine (e.g., from a lookup table) how to perform the fine calibration of each module. In addition, prior to each analytical sequence, the system can check the magnetic identifications to verify the X axis location of each magnetic identification relative to the most recent calibration. Checking the location of the magnetic identifications in this way can avoid malfunctions due to movement or removal of modules since the last system calibration. In some embodiments, a respective rail support mount (e.g., the GC/rail support mount on the right side of the system) also includes a magnetic identification, which can be used to confirm that the rail was not repositioned since the prior calibration.

In some embodiments, the autosampler system can analyze samples from gas containers without the use of syringes. Some embodiments of the disclosure allow larger sample volumes to be measured without loss of compounds due to shorter transfer line distances between the sample container and the sample preconcentration or injection unit. In some embodiments, the autosampler system can handle sample containers at varying positive and negative pressures by controlling the flow of sample through a trapping system while measuring the mass transferred using a vacuum reservoir, which is initially lower in pressure (e.g., −14 psig) than the pressure of the sample containers (e.g., −8 to 40 psig). In some embodiments, the gas sample has a pressure that is less than atmospheric pressure while the sample is contained in the sample container. In some embodiments, the gas sample has a pressure that is greater than atmospheric pressure while the sample is contained in the sample container. In some embodiments, the gas sample has a pressure that is (e.g., approximately, substantially) equal to atmospheric pressure while the sample is contained in the sample container. In some embodiments, the gas sample has a pressure that is less than, equal to, or greater than atmospheric pressure while the sample is contained in the sample container. In some embodiments, the vacuum reservoir is disposed within a unit that further includes a sample preconcentrator. The pressure difference between the vacuum reservoir and the sample containers can drive the transfer of gas from the sample container through the trap(s) (e.g., of a trapping/preconcentration system) without the introduction of an additional gas to the system while collecting the sample and then to the collection reservoir for measurement of untrapped balance gases (e.g., fixed gases such as air, nitrogen, carbon dioxide, helium, and/or hydrogen). In some embodiments, the vacuum reservoir is fluidly coupled to a sampling wand configured to be fitted to a sample container, thereby enabling the system to draw a predetermined amount of sample into a preconcentration system or chemical analysis device using the vacuum reservoir. In some embodiments, the autosampler moves the samples to a sample extraction location, and the gas phase sample is recovered without adding a gas to push the sample out, and therefore without diluting the sample with such a pressurization gas. In some embodiments, this extraction location has a heater to pre-heat the sample to support the recovery of lower volatility components in the sample container In addition, a low cost manual version of this solution is presented to allow laboratories to test this technology and develop methods prior to acquiring a fully automated autosampler system. The manual version can use the same sample interface and preconcentration modules as the automated rail system, allowing direct transfer of methods from manual to automated operation.

Exemplary Systems and Processes

Figure 1B:
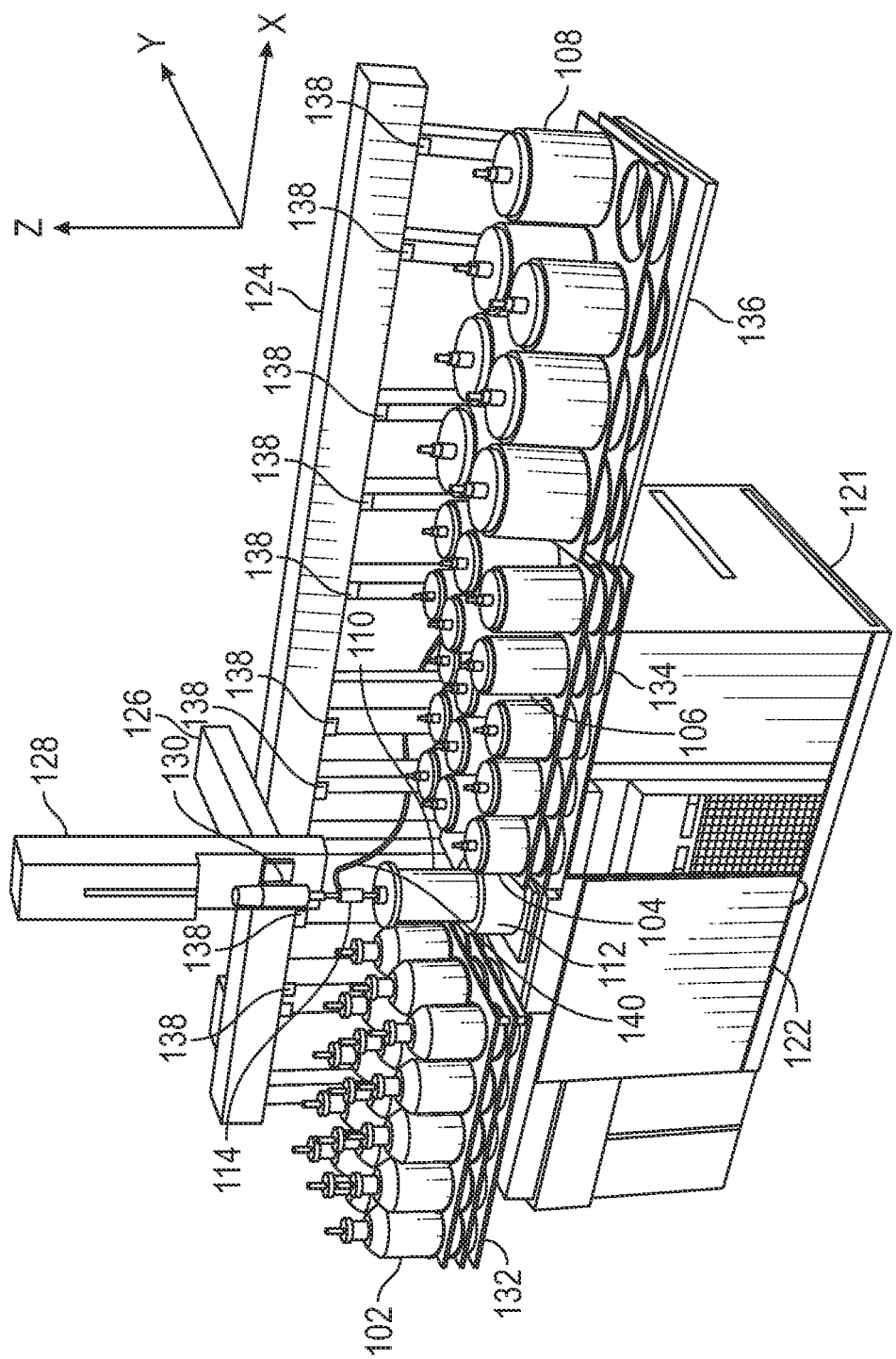
Figure 1C:
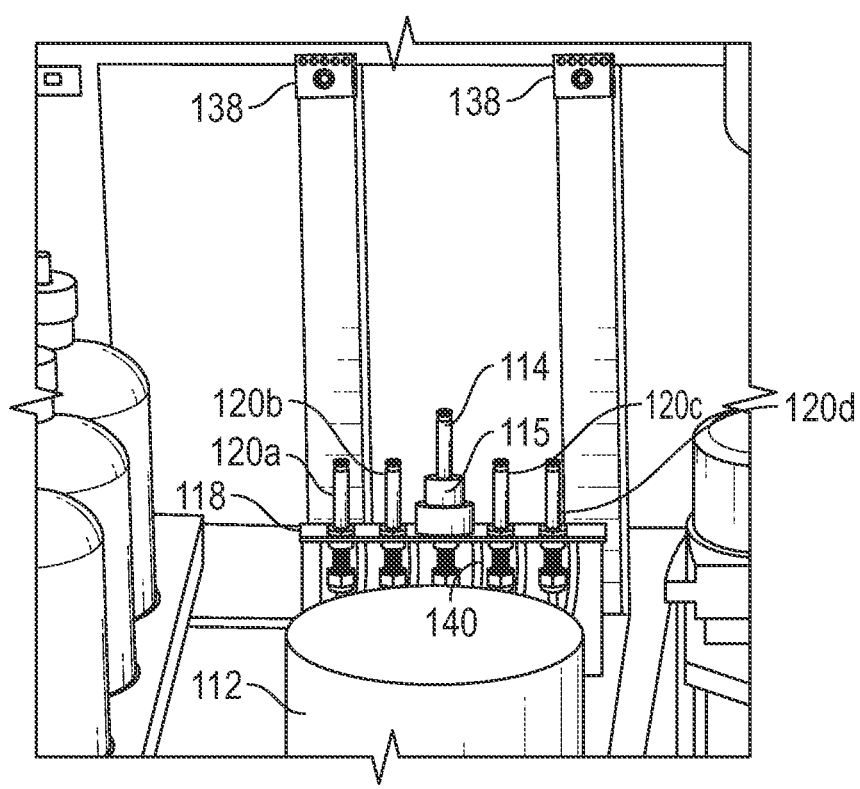

FIGS. 1A-1C illustrate an exemplary autosampler system 100 according to some embodiments of the disclosure. In some embodiments, the autosampler system 100 can be disposed on top of a chemical analyzer 122 (e.g., a GC or GCMS) and/or sample preconcentrator 121. The autosampler system 100 can include an X-axis rail 124, a Y-axis rail 126, and a Z-axis rail 128 configured to facilitate movement of pickup tool 130 in three dimensions. In some embodiments, the pickup tool 130 is configured to pick up, move, and/or manipulate sample containers 102, 104, 106, and/or 108 and sample wand 114. Sample containers 102, 104, 106, and 108 can be disposed in sample trays 132, 134, and 136, respectively. In some embodiments, sample trays 132, 134, and 136 are coupled to the autosampler system 100 using clamps 138, which can include magnetic identifications associated with calibration data of the respective module (e.g., sample tray 132, 134, 136) coupled to the autosampler system 100 by the respective clamp 138, as described in more detail below with reference to FIGS. 4A-5B.

In some embodiments, the autosampler system 100 has the ability to analyze large volumes of gas phase sample. The autosampler system 100 can accommodate relatively large sample containers (e.g., gas canisters) such that the relatively large sample containers can be lifted over the top of other sample containers (e.g., in the sample trays) without colliding with the other sample containers, the Z-axis rail 128, or any internal components of the Z-axis rail 128. The pickup tool 130 of the autosampler system 100 can include a gripper mechanism configured to pick up each sample container 102, 104, 106, 108, and 110 to move the sample container to the sampling platform 112 for sample preparation (e.g., preconcentration) and analysis. Moreover, in some embodiments, as will be described in more detail below (e.g., with respect to FIG. 1C), autosampler system 100 can include a gas management system that also facilitates the use of relatively short transfer lines to improve sample recovery and reduce carryover between uses of the system 100.

In some embodiments, each of the X-axis rail 124, Y-axis rail 126, and Z-axis rail 128 includes a motor and encoder. The motors can be stepper motors or server motors, for example, though other types of motors are possible. In some embodiments, each motor is coupled to an encoder that can track each step or incremental movement taken by the respective motor to track the position of the rails 124-128 and pickup tool 130 in three dimensions. In some embodiments, if one or more of the motors stalls (e.g., due to reaching an obstacle, such as a sample container, the end of a rail, or something else), the system is still able to maintain an accurate determination of the positions of the rails 124-128 and pickup tool 130. In some embodiments, the motors are controlled by a triple axis controller that can independently control the motion of each axis.

FIGS. 1A-1C show the autosampler system 100 using 1 L glass bottles 102, 1 L stainless steel canisters 104, 1.4 L stainless steel canisters 106, and 2.5 L stainless steel canisters 108 as sample containers, for example. Thus, in some embodiments, the autosampler system 100 can be compatible with a variety of sample containers by exchanging the sample trays used with the system. In some embodiments, the glass bottles are deactivated prior to use, and the stainless steel canisters typically include an internal ceramic coating to improve the inertness and storage time of a chemical mixture after sampling, and before analysis. Each sample container can include a Micro QT valve (QT—Quarter inch Tube) that allows a quick connect opening and closing of the valve, as well as a detent at the top of the valve that can allow the autosampler to pick up and move the respective container. In some embodiments, the autosampler system is compatible with sample containers having a wide array of volumes and/or outer diameters. For example, the autosampler system is able to accommodate sample containers with an outer diameter in the range of ¼ inch to 5.2 inches and volumes in the range of 1 cc to 2500 cc. As an example, the autosampler system 100 can extract a sample from a ¼" tube fitted with a micro QT valve.

In some embodiments, the autosampler system is able to draw a sample having a volume in the range of 1-2500 cc into the preconcentration system 121 (e.g., using sampling wand 114). In some embodiments, the amount of sample drawn is greater than 0.1, 1, 3, 5, 10, 15, 20, 25, 50, 100, 200, 300, 500, 1000, 1500, or 2000 cc. In some embodiments, the amount of sample drawn is less than 100, 300, 500, 1000, 1500, 2000, or 2500 cc. It should be understood that the autosampler system is able to draw sample volumes in ranges having any of the upper or lower boundaries disclosed herein without departing from the scope of the disclosure. In some embodiments, the autosampler system is able to draw a sample having a volume outside of one or more range(s) expressly disclosed herein without departing from the scope of the disclosure.

In some embodiments, the autosampler system is able to draw a sample from a sample container having a diameter in the range of ¼ inch to 5.2 inches. In some embodiments, the sample container has a diameter that is greater than ¼, 1, 2, 3, 4, 5, 6, or 10 inches. In some embodiments, the sample container has a diameter that is less than ½, 1, 2, 3, 4, 5, 6, 7 or 11 inches. It should be understood that the autosampler system is able to draw samples from sample containers having diameters in ranges having any of the upper or lower boundaries disclosed herein without departing from the scope of the disclosure. In some embodiments, the autosampler system is able to draw a sample from a sampling container having a diameter outside of one or more range(s) expressly disclosed herein without departing from the scope of the disclosure.

In FIG. 1A, for example, the autosampler system 100 is lifting a 1.4 L canister 110 with pickup tool 130 to transfer the 1.4 L canister 110 to sampling platform 112. In some embodiments, the sampling platform 112 can be positioned close to sample preconcentrator 121. The position of sampling platform 112 can reduce the length of transfer lines between the sample and the preconcentrator 121 and can therefore reduce the exposure of the sample to potentially reactive surfaces. In some embodiments, a cylinder on the sample platform 112 can be either heated or unheated, and can help to maintain the position of the canister 110 while it is being analyzed.

In FIG. 1B, the 1.4 L canister 110 is positioned the sampling platform 112 with the sampling wand 114 placed on top of the canister 110 to access the sample inside, for example. The sampling wand 114 can be coupled to a heated transfer line 140, which allows transfer of the gas sample to the sample introduction system, such as sample preconcentrator 121. Thus, in some embodiments, the sampling wand 114 and preconcentrator 121 are fluidly coupled. In some embodiments, the sampling wand 114 and preconcentrator 121 are distinct components. In some embodiments, the sampling wand 114 and preconcentrator 121 are distinct components fluidly coupled to one another (e.g., via transfer line 140). In some embodiments, the sampling wand 114 is able to collect gas sample from sample container 110 without the introduction of an additional gas while the sample is being collected.

As shown in FIGS. 1A-1B, the autosampler system 100 can be disposed on top of the chemical analyzer 122 (e.g., a GC or GCMS), thus conserving laboratory bench space compared to systems in which the autosampler system 100 is positioned adjacent to the chemical analyzer 122 and/or compared to floor-standing autosamplers that consume lab space, create clutter, add additional transfer lines, and overall reduce laboratory efficiency. In some situations, a computer, monitor, keyboard and/or mouse data system can be placed to the right of the chemical analyzer 122 beneath the canisters 104-108, providing improved utilization of bench space, for example.

FIG. 1C illustrates a detailed view of the sampling platform 112 of the autosampler system 100 according to some embodiments. In some embodiments, while not in use, the sampling wand 114 can be supported by a support structure 118. In some embodiments, the support structure 118 can further retain Micro QT valves 120a-d to allow other gases to be introduced through the wand, such as one or more internal standards, calibration standards, and an inert flush gas to clean up the sampling wand and heated line after exposure to the sample. In some embodiments, one or more of these gases can be introduced to the system to be included in the chemical analysis of the sample. For example, the sampling wand 114 can introduce (1) a predetermined amount of the high or low concentration standard for generation of calibration curves to prove response linearity with increasing sample concentration, (2) a predetermined amount of the internal standard introduced to each analysis to support internal standard calibration methods generally required when performing GCMS analysis and (3) a predetermined amount of the sample to the system. Thus, in some embodiments, the standards are not introduced simultaneously with the gas sample, but both the standards and the gas sample are included in the analysis of the sample. In some embodiments, the sample holder of the sampling platform 112 can be exchanged to match the size of the sample container currently being analyzed. In some embodiments, the sample holder of the sampling platform 112 is exchanged manually; in some embodiments, weak springs below one or more support structures (e.g., rings, posts) can enable automatic fitting of a sample holder to the sample container disposed on the sampling platform 112. For example, relatively large sample containers can push the one or more support structures for smaller containers down and instead engage with one or more support structures that fit outside the footprint of the relatively large sample container. In some embodiments, the sample holder of the sampling platform 112 can include a heater configured to preheat and/or heat the sample while the sample is in the sample container.

In some embodiments, the system 100 applies a gentle force with the sampling wand 114 while sample container 110 is disposed on the sampling platform 112 to open the QT valve on the canister 110 to allow access to the sample inside. Once the sampling wand 114 is connected to the canister 110, the preconcentration unit 121 can draw a predetermined volume (e.g., and/or mass) of sample from container 110 (e.g., using a mass flow controller or vacuum reservoir (e.g., to take differential pressure measurements to determine volume or mass sampled) downstream of the trapping system of the preconcentrator 121 fluidly coupled to the sampling wand 114) without introducing another gas to the system while drawing the sample, for example. In some embodiments, after sample extraction, the sampling wand 114 can be placed back into support structure 118. In some embodiments, a vacuum can then be exerted on the sampling wand 114 to eliminate carryover to the next analysis. Next, in some embodiments, pickup tool 130 can move the sample container 110 to sample tray 136. The extracted, trapped sample can be further processed to remove water vapor, and potentially further focused before rapid injection into the chemical analyzer 122.

In some embodiments, support structure 118 houses additional micro QT valves to which the sampling wand 114 can be coupled to introduce one or more standards and/or purge gas(es) into the preconcentration system 121 and/or chemical analysis system 122. For example, valve 120a can be coupled to a first standard (e.g., a high concentration standard), valve 120b can be coupled to a second standard (e.g., a low concentration standard), valve 120c can be coupled to a third standard (e.g., an internal standard), and valve 120d can be coupled to a purge gas. In some embodiments, some preconcentrators can only accurately preconcentrate from 10-500 cc (only a factor of 50×). Thus, in some embodiments, two different standards (e.g., a high concentration standard 120a and a low concentration standard 120b) can be provided to enable a total concentration range of 2000× by making the concentrations different by a factor of 20-100×. In some embodiments, an internal standard 120c, is added to each analysis to track any changing sensitivities of the chemical analyzer (e.g., an MS). In some embodiments, the system collects sample from the sample container and introduces one or more standards to the system at different times and includes both the sample and the standards in the analysis of the sample.

Support structure 118 can further include cradle 115 to which sampling wand 114 can be coupled while not in use. In some embodiments, cradle 115 can include an internal seal (e.g., one or more o-rings) so that the sampling wand 114 can be exposed to a vacuum when coupled to cradle 115. Coupling the sampling wand 114 to the cradle 115 in this way can reduce carryover of sample compounds between analyses.

Figure 2:
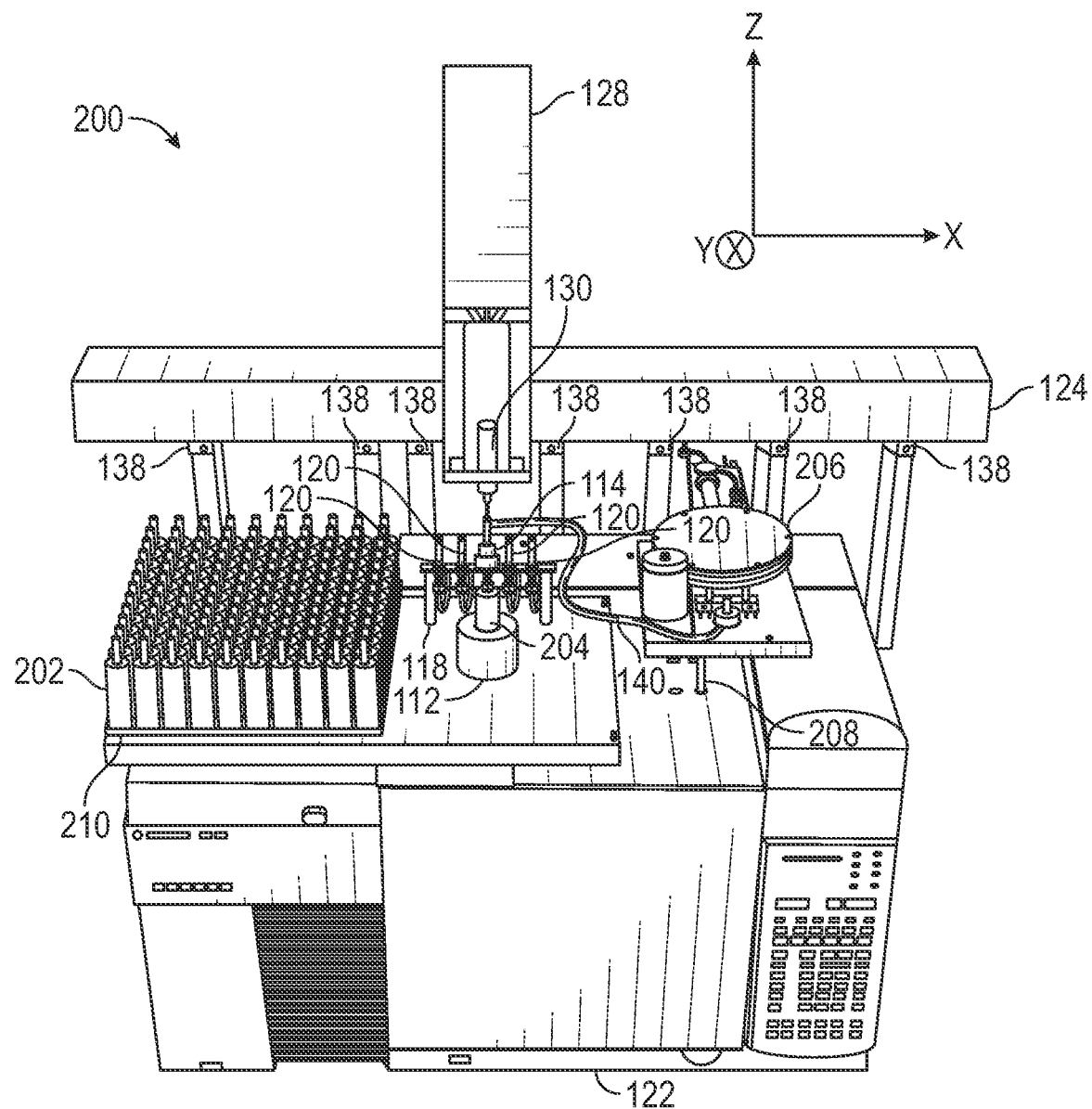
FIG. 2 illustrates an example autosampler system according to some embodiments of the disclosure.

FIG. 2 illustrates an example autosampler system 200 according to some embodiments of the disclosure. In some embodiments, the autosampler system 200 can be disposed on top of a chemical analyzer 122 (e.g., a GC or GCMS). The autosampler system 200 can include an X-axis rail 124, a Z-axis rail 128, and a Y-axis rail (hidden from view behind the Z-axis rail 128 FIG. 2) configured to facilitate movement of pickup tool 130 in three dimensions. In some embodiments, the pickup tool 130 is configured to pick up, move, and/or manipulate sample containers 202 and 204 and sample wand 114. In some embodiments, sample tray 210 is coupled to the autosampler system 200 using clamps 138, which can include magnetic identifications associated with calibration data coupled to the autosampler system 100 by the respective clamp 138, as described in more detail below with reference to FIGS. 4A-5B.

In FIG. 2, the autosampler system 200 is configured to analyze samples held in sample containers 202 with volumes in the range of 1-50 cc, for example. In some embodiments, rather supporting the concentration of 10-1000 cc of sample to achieve sub-PPB level detection limits as shown in FIGS. 1A-1C, for example, FIG. 2 illustrates the autosampler system 100 in use to analyze samples held in smaller sample containers 202, where only 1-50 cc volumes are needed to measure samples from 1 PPB to 1000 PPM. The smaller volumes can be handled by smaller or fewer trapping stages, such as the trapping system 206 placed directly on the autosampler system 200, for example. In some embodiments, the trapping system 206 can concentrate the sample, eliminate unwanted water vapor, and facilitate rapid transfer of the sample through (e.g., heated) transfer line 208 into the chemical analyzer 122 (e.g., a GC or GCMS) for analysis.

The configuration illustrated in FIG. 2 can be used for industrial hygiene workplace samples, and for measurement of PPM level constituents in other industrially derived gases, for example. This configuration can also be used to perform large volume static headspace (LVSH) analysis of vials containing liquid and solid phase samples, using small to large vials (e.g., similar to sample containers 202) with screw on lids that have a Micro QT valve at the top of the vials. This configuration can allow analysis of volatile to semi-volatile compounds during heated or unheated vial analysis under equilibrium conditions to provide feedback on concentrations in the headspace at specific temperatures. This can be extremely important, as it is often the olfactory sensing of the complex volatile headspace that consumers use to rate a product rather than the true composition of the liquid or solid product itself, and the ability to quantify both "good and bad" smells is critical to the development of products that are well accepted in the market place, for example.

Figure 3:
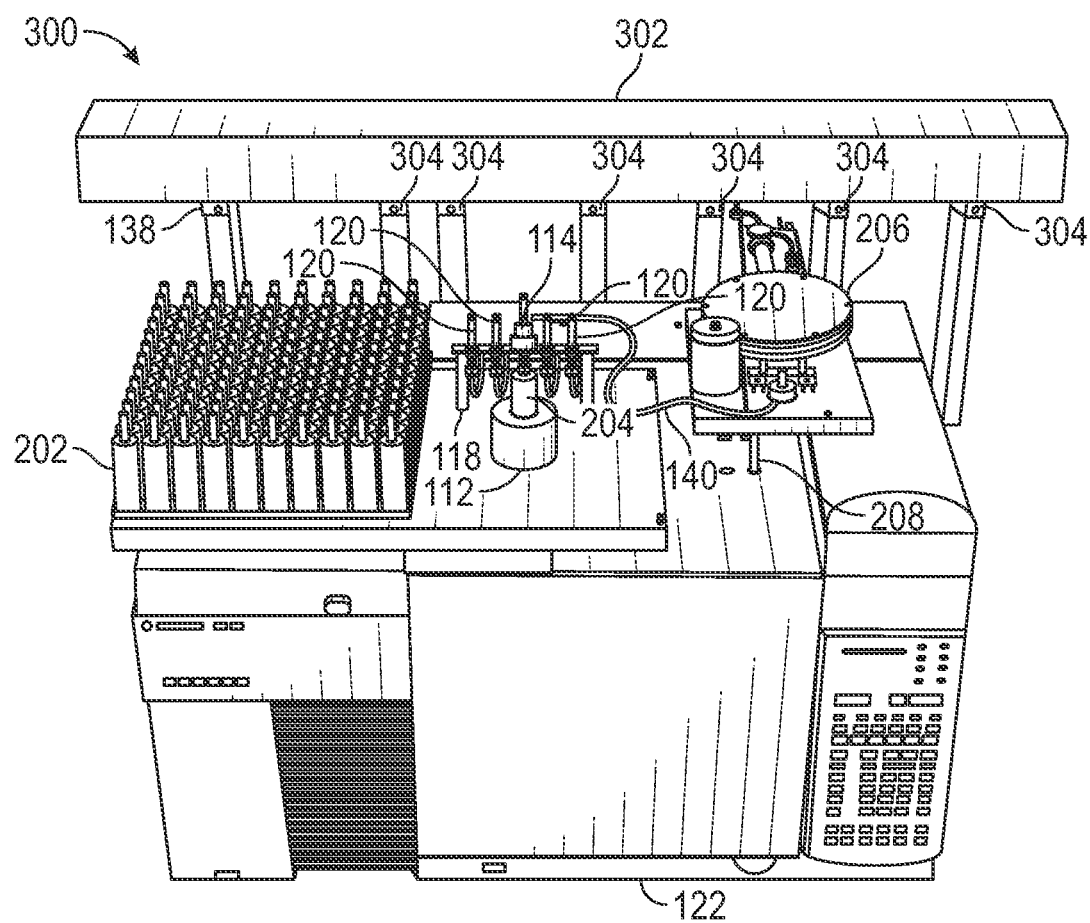
FIG. 3 illustrates a manual configuration of a chemical analysis system according to some embodiments.

FIG. 3 illustrates a manual configuration of a chemical analysis system 300 according to some embodiments. Chemical analysis system 300 can be similar to autosampler systems 100 and 200, except chemical analysis system 300 does not include an autosampler device, for example. In some embodiments, chemical analysis system 300 can be used to manually prepare and analyze chemical samples. For example, a laboratory can purchase chemical analysis system 300 to manually develop preparation and analysis methods before upgrading system 300 to include an autosampler, thereby converting system 300 to an autosampler system similar autosampler system 100 or 200.

In some embodiments, the chemical analysis system can include sample vials 202, sampling wand 114, sample preconcentration system 206, and chemical analyzer 122 (e.g., a GC or GCMS). In some embodiments, the sampling wand 114 is coupled to a transfer line 140 to transfer sample from sample container 204 to the sample preconcentration system 206. The sample preconcentration system 206 can be coupled to the chemical analyzer 122 via transfer line 208. In some embodiments, chemical analysis system 300 can include bracket 302 to which sample trays, including sample tray 210, can be coupled to the chemical analysis system 300 via clamps 304. Although in some embodiments the clamps 304 can include magnetic identification, in some embodiments, the clamps 304 do not include magnetic identification because chemical analysis system 300 is a manual system operated by a human instead of an automated system operated robotically. In some embodiments, chemical analysis system 300 can be modified to include an autosampler to upgrade chemical analysis system 300 to an autosampler system similar to autosampler system 100 or 200.

Figure 4A:
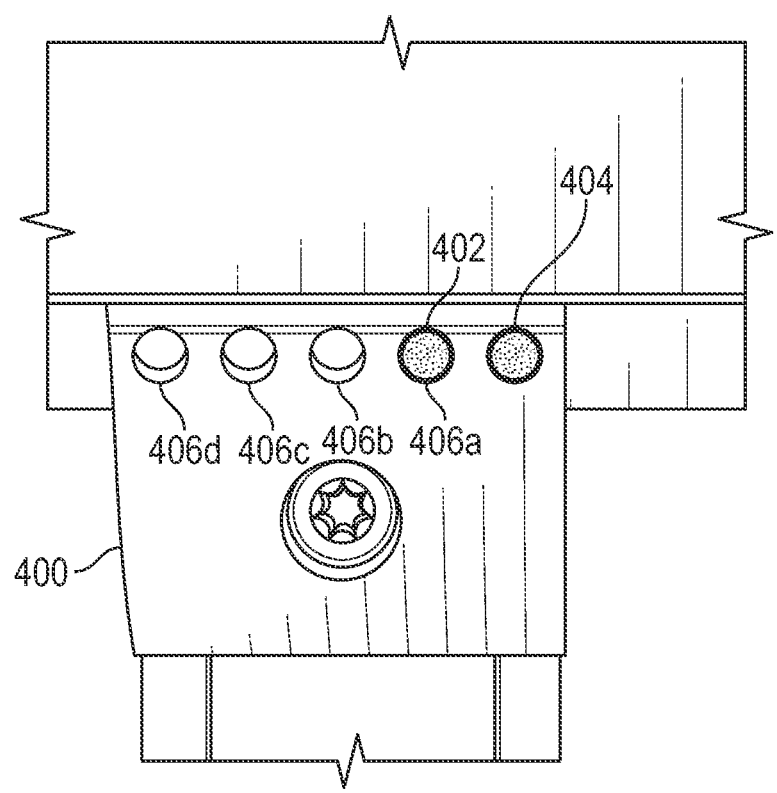
FIGS. 4A-4B illustrate exemplary clamps that can be used to attach modules and mounting legs to the rail system in accordance with some embodiments.
Figure 4B:
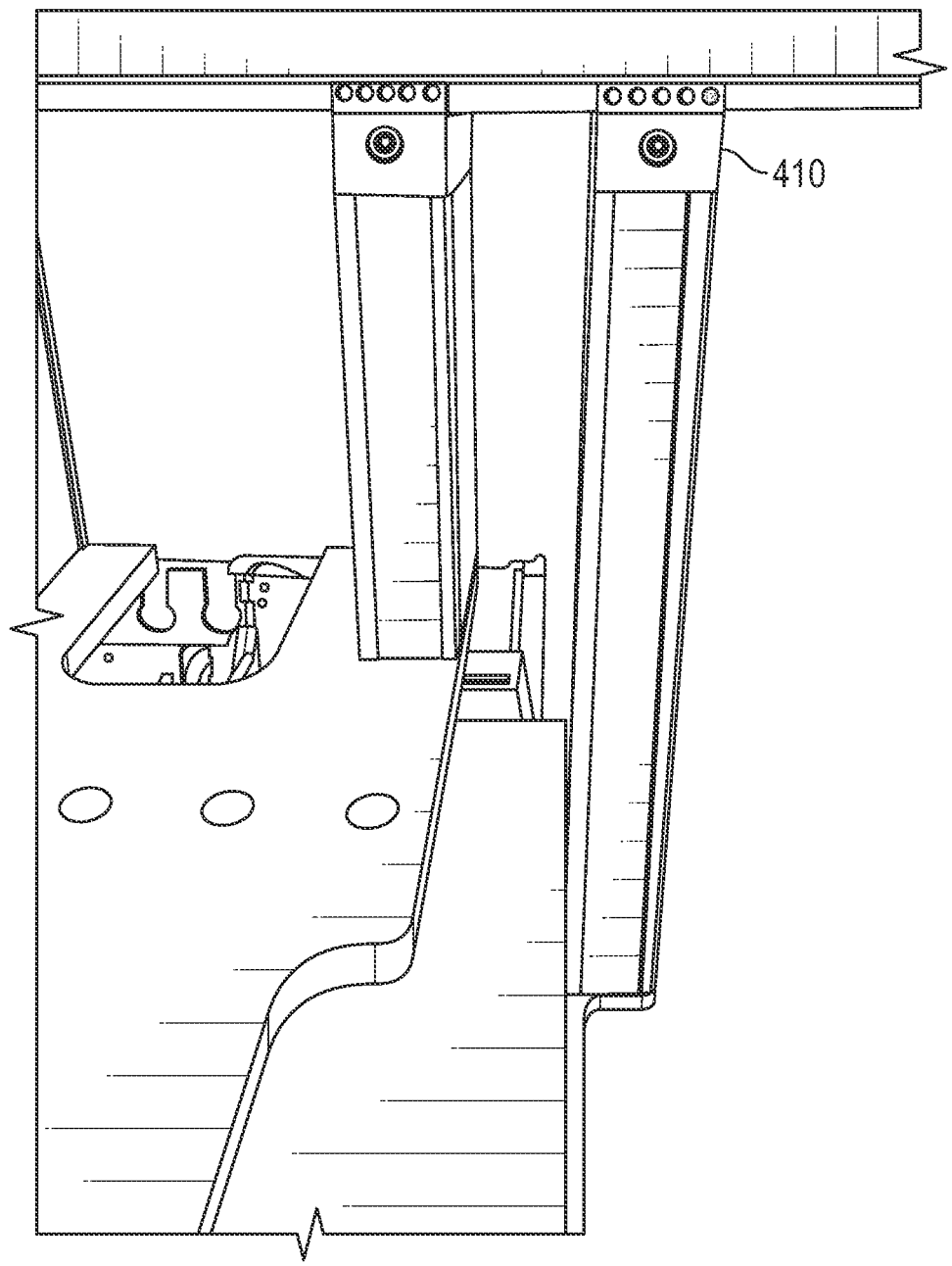

FIGS. 4A-4B illustrate exemplary clamps 400 and 410 that can be used to attach modules and mounting legs to the rail system in accordance with some embodiments. In some embodiments, as shown in FIG. 4A, clamp 400 includes a magnet 404 that indicates that clamp 400 includes an identification tag, and a magnet 402 that creates a binary identification code to identify which module (e.g., sample trays, rail mounts, etc.) is attached to that clamp 400. In some embodiments, clamp 400 includes positions 406a-406d that may each include or not include a magnet (e.g., magnet 402 included in position 406a). For example, clamp 400 includes a magnet 402 in position 406a and does not include magnets in positions 406b-d; thus, clamp 400 can include the identification code "1". Magnet 404 can be used to distinguish this clamp 400 from other clamps in the autosampler system that do not include identification codes.

Figure 4C:
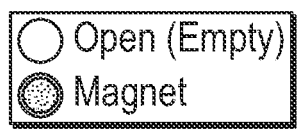
FIG. 4C illustrates an exemplary look up table including the binary codes that can be used in identification clamps according to some embodiments of the disclosure.

In some embodiments, during a calibration process of the autosampler system, the X-axis rail (e.g., X-axis rail 124 illustrated in FIGS. 1A-1B and FIG. 2) of the autosampler system (e.g., autosampler system 100 or 200) is scanned (e.g., from right to left or left to right), and magnetic sensors on the back of the Z-axis rail (e.g., Z-axis rail 128 in FIGS. 1A-1B and FIG. 2) are used to locate any clamp(s) (e.g., clamps 138) with an identification tag along the X-axis of the autosampler system. In some embodiments, each binary code can correspond to a respective module that is compatible with the autosampler system for which the autosampler system is able to look up calibration information for the respective module. For example, the calibration information can include the number of sample containers retained by the module and the location(s) of the sample containers relative to the identification clamp. Thus, in some embodiments, the identification clamps can be used to calibrate the autosampler system prior to analysis. In some embodiments, the system can associate the binary codes (e.g., binary code "0" in which positions 406a-d in FIG. 4A each do not include a magnet) with respective support structures of the autosampler system. For example, in FIG. 4B, clamp 410 can indicate the location of the rightmost support leg that couples the autosampler rails to the chemical analyzer. An example showing the magnets and codes that create all sixteen codes is shown in FIG. 4C. In some embodiments, the autosampler system can use the identification codes to identify the location of the canister sampling platform and whether an on-rail preconcentration unit is present.

FIG. 4C illustrates an exemplary look up table 401 including the binary codes that can be used in identification clamps according to some embodiments of the disclosure. As shown in FIG. 4C, each binary code can include a magnet in the rightmost position, thereby indicating that the clamp includes a binary code in the four leftmost positions, for example. In some embodiments, there are sixteen possible binary codes from 0-15. In some embodiments, one of the codes (e.g., "0") can be reserved for a respective support structure of the autosampler system (e.g., the right support leg that couples the autosampler system to the chemical analyzer) and the remaining codes can each be associated with a respective module that is compatible with the autosampler system. For example, the remaining binary codes (e.g., codes "1"-"15") can each be associated with a respective sample tray or a control/extraction module on the rail and can be associated with calibration table stored in a lookup table accessible to the autosampler system. In some embodiments, the calibration data can include information such as the number of sample containers in the respective tray and the (e.g., X, Y, and/or Z) positions of the sample containers relative to the binary identification code of the clamp. In some embodiments, the calibration information includes the X, Y locations of the sample containers in the respective sample tray corresponding to the binary code. In some embodiments, a respective sample tray can be configured to hold multiple sizes of sample containers. For example, a respective sample tray can hold 1 L canisters and/or 1.4 L canisters having different heights. Moreover, in some embodiments, the type of valve at the top of each sample container can vary (e.g., sample containers can include a MQT valves only or TrueSeal Valves+MQTs) which can cause the height of the target (e.g., the seal of the sample container) to vary as well. In some embodiments, in the software and during creating of a sequence table, an analyst can indicate the canister configuration from which the expected Z height of the sample containers can be determined by the system. In some embodiments, rather than determining the Z-height based on configuration information, the autosampler system can operate the Z-axis motor on a low power setting to allow the Z-axis to lower the pickup tool 130 until it gently stalls (e.g., when it reaches the top of the sample container), thereby determining the height of the sample container. In some embodiments, the autosampler system can withstand this method of determining the Z-height of the sample container (e.g., on the order of millions of times) without suffering damage to the internal drive mechanisms. The autosampler system can use this calibration information to locate the sample containers for chemical analysis, for example.

Figure 5A:
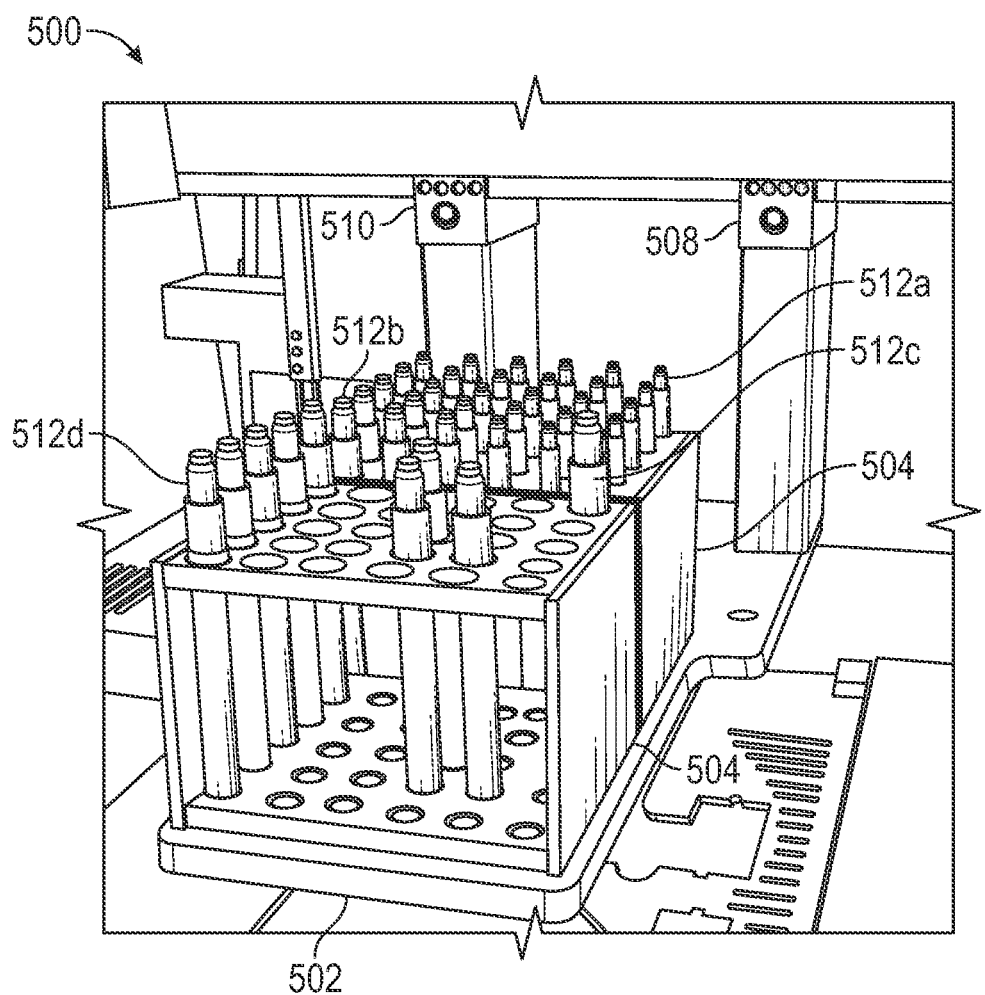
FIG. 5A illustrates an exemplary autosampler system with a module having two sample trays including samples for thermal desorption analysis.

FIG. 5A illustrates an exemplary autosampler system 500 with a module 502 having two sample trays 504 including samples for thermal desorption analysis. Module 502 can include two support legs 506a and 506b that can be coupled to the X-axis rail of the autosampler system 500. As shown in FIG. 5A, support leg 506b can include an identification clamp 508, whereas support leg 506a may include a clamp 510 that does not include a magnetic identification, for example. In some embodiments, the identification clamp 508 of the module 502 is positioned at a respective predetermined location relative to the module 502, such as being integrated with the rightmost support leg 506b of the module 502. By placing the identification clamp 508 in a predetermined orientation relative to the rest of the module 502, the system can locate the sample containers 512 of the module 502 based on the calibration information associated with identification code 508. In some embodiments, the system 500 first identifies the sample containers 512a-d in the first and last positions of each sample tray 504 based on the calibration information associated with identification 508 and is able to fine-tune the calibration of the remaining sample containers.

In some embodiments, the pickup tool of the autosampler system, which can be disposed at the bottom of the Z-axis rail, has a large cone of acceptance, allowing the alignment between pickup tool and the target to be offset by a substantial distance (e.g., about 0.5 centimeters or less) during calibration without impacting the functionality of the system. Typically, the offset between the pickup tool and the target is less than about 0.5 centimeters when calibrating the system based on the location(s) of the targets relative to the magnetic identification clamp, which means the auto calibration process is substantially reliable.

Figure 5B:
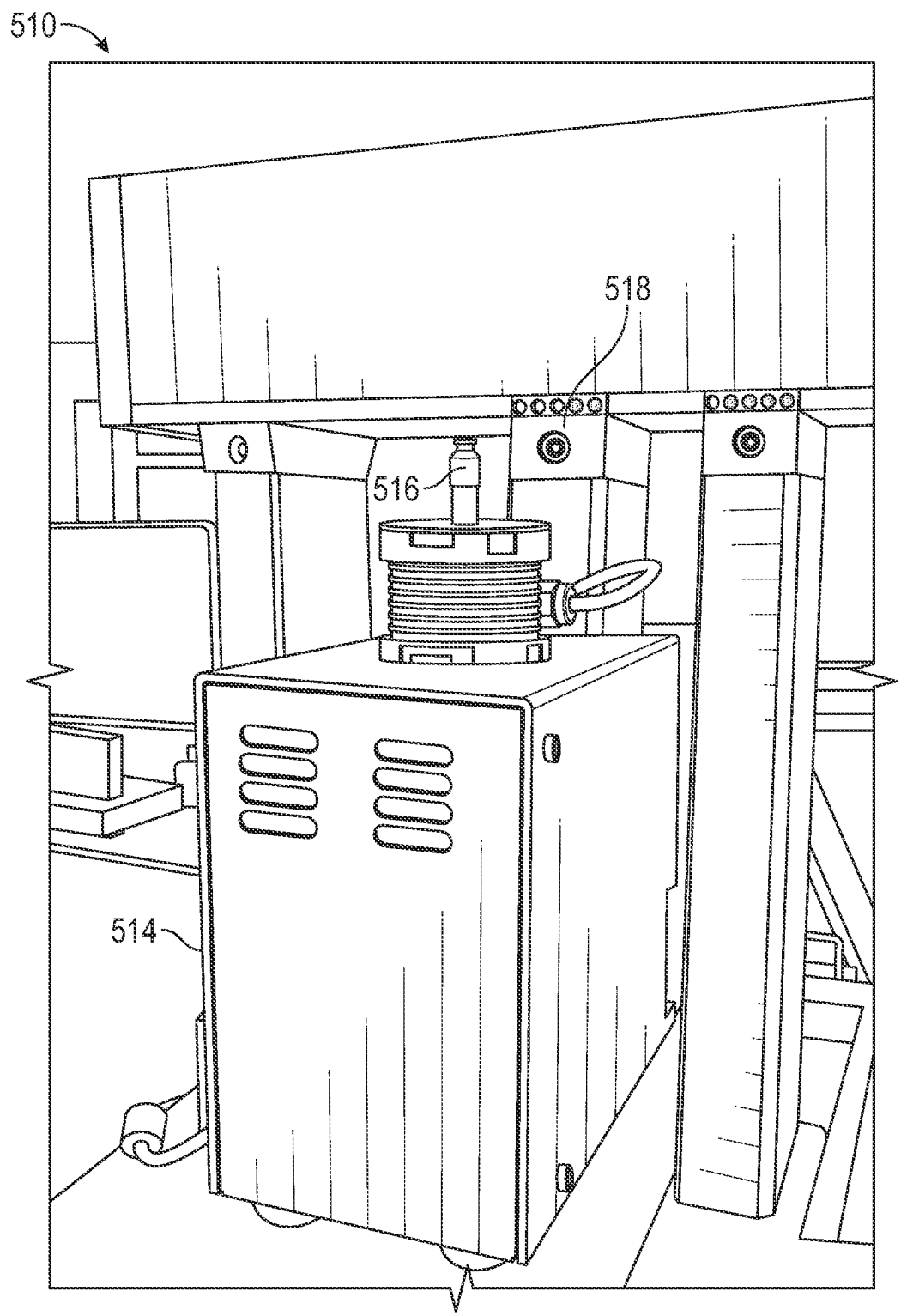
FIG. 5B illustrates operation of an exemplary autosampler system with a thermal conditioning system for cleaning a sample container according to some embodiments of the disclosure.

FIG. 5B illustrates operation of an exemplary autosampler system 501 with a thermal conditioning system 514 for cleaning a sample container 516 according to some embodiments of the disclosure. In some embodiments, the thermal conditioning system 514 is coupled to the autosampler system 501 via identification clamp 518. For example, clamp 518 can include a magnet in the rightmost position indicating that clamp 518 includes a binary magnetic identification and a magnet in the fourth position from the left (e.g., corresponding to binary code "1"). In some embodiments, the binary code of clamp 518 can be associated with the thermal conditioning system 514. The autosampler system 501 can detect the identification code of clamp 518 and look up calibration information for the thermal conditioning system 514 that can be used to locate the sample container 516 (e.g., with the pickup tool of the autosampler system), and likewise the lookup table in the software allows the proper identification of this module, along with the determination of the number and location of the targets for fine calibration.

Some embodiments of the disclosure can be used to perform both quantitative and qualitative chemical analysis of volatile chemicals in samples by GC and GCMS. The autosampler system can be compatible with sample containers including stainless steel and glass vacuum sampling canisters, and Tedlar bags when located on ports on or near the sampling platform. Examples of methods that can use this technology include US EPA Method TO-15/TO-15A, OSHA Methods 1021 and PV2120, China Method HJ759, and other canister methods from Taiwan, Japan, and elsewhere. As explained previously, small to large glass vials with gas-tight seals and a Micro QT valve or compatible valve on top can be used to analyze the headspace above liquid or solid samples, which have hundreds of applications for analysis of industrial and consumer products. The sample gas can be pulled or pushed through a loop for small volume transfer to a GC, or first through a preconcentration trap to increase the concentration of organic chemicals to improve detection limits, and to reduce the volume to increase the injection rate into the GC to support low capillary flow rates. The rail based design can conserve laboratory space, such as by placing the samples over the GC or GCMS, taking advantage of under-utilized vertical space in the lab. Unlike canister autosamplers that require attachment of each sample using a separate line, in some embodiments of the disclosure, the sample containers are placed in trays for faster loading and unloading of samples, allowing just one sampling line to maintain far better system consistency and hygiene over multi-inlet line autosamplers. The sampling platform that holds the sample can be heated to promote the transfer of heavier compounds into the gas phase to increase the recovery of higher boiling compounds that may be only partially volatile at room temperature. The non-automated version of the system (e.g., as described above with reference to FIG. 3) has been presented as a way for laboratories to test these applications and develop methods prior to investing in a fully automated X, Y, Z rail system.

The clamp identification system for auto calibration and verification prior to analysis can be used on any rail system, for any application, including any GC, GCMS, or offline sample preparation rail systems used to automate and/or prepare samples for GC or GCMS analysis. A magnetic or other identification code (RFID, IR, barcode, other) as positioned on the clamps coupling the modules to the rail to the GC allows for fast and accurate calibration when adding, removing, or repositioning any modules on the X-axis rail, or when moving the rail itself to reposition the rail system (e.g., to provide better weight distribution or to avoid conflict with other devices on or near the GC or GCMS).

Figure 6:
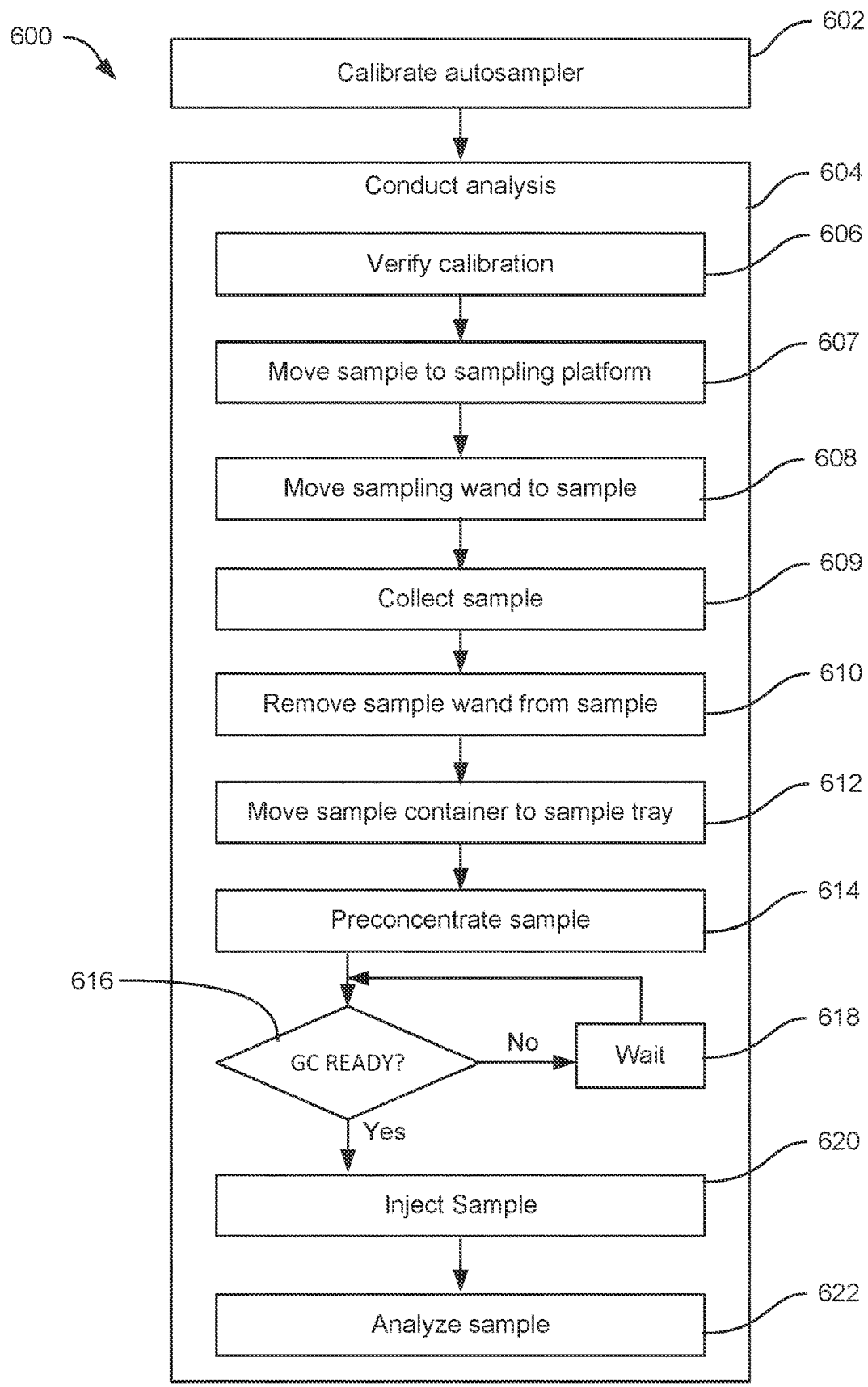
FIG. 6 illustrates an exemplary method of analyzing a sample using an autosampler system according to some embodiments of the disclosure.

FIG. 6 illustrates an exemplary method 600 of analyzing a sample using an autosampler system according to some embodiments of the disclosure. In some embodiments, the method can be performed using an autosampler system, such as autosampler system 100 or autosampler system 200 described above with reference to FIGS. 1A-2. In some embodiments, magnetic identification clamps, such as the magnetic identification clamps described above with reference to FIGS. 4A-5B, can also be used to perform the method. In some embodiments, one or more steps of the method are executed using one or more processors storing instructions (e.g., one or more programs) that, when executed by a device (e.g., an autosampler system) cause the device to perform the one or more method steps.

In some embodiments, before calibrating the autosampler (602), the system can use a proximity switch and metal flag to mark a reference point at which X, Y, Z=0. In this way, in some embodiments, the autosampler system can identify the reference point (e.g., the "home" position) as needed while in use. The flags are inside of the autosampler and cannot be (easily) accessed or changed by the user, so they remain a constant, for example. In some embodiments, the system is typically "homed" in this way when first powered up, or at a frequency that will confirm that no loss of position accuracy has occurred. Combined with relative position offsets as determined by magnetic identification calibration routines, reliable "home" positions for the X, Y, and Z axes can provide accurate "absolute" coordinates during operation, for example.

When the system is first set up, a full calibration is performed (602). In some embodiments, calibration includes scanning the X-axis rail of the autosampler system for clamps including magnetic identifications by positioning a sensor over the clamp to read the code of the clamp. For example, a 5 sensor reader can be aligned with the five positions of the clamp that can include magnets in order to accurately determine the code of the clamp. In some embodiments, alignment can be achieved by aligning, for example, the rightmost detected magnet with the, for example, rightmost magnetic sensor, as all clamps that include a binary code also include a magnet in the rightmost position of the clamp. In some embodiments, rather than using the rightmost position as the position of reference, a different position on the clamp can be used as a reference (e.g., leftmost position, center position, etc.). Once the sensors are aligned, the system can read the binary code created by one or more magnets in the four leftmost positions of the clamp, for example. This process can be repeated for each clamp including a code along the X-axis rail of the system. After reading the codes of the clamps, the system can fine-tune calibration of any modules requiring fine-tuning. In some embodiments, fine tuning of position "0", the right leg of the autosampler system, is unnecessary. In some embodiments, this calibration only has to be done once, but if a single module is changed out, the system can be instructed to scan for that one module to add it to the list of current modules, and to perform the fine tune calibration of the added module if needed.

In some embodiments, after calibration, the system can conduct chemical analysis (e.g., of one or more samples, blanks or standards) (604).

In some embodiments, during automated analysis, the autosampler system verifies the calibration (606). In some embodiments, the autosampler system first zeros itself (detects the home flag first for the Z, then the Y, then the X Axis), then to each position where a magnetic clamp is expected to verify the magnetic clamps have not moved since calibration 602.

In some embodiments, if a sample position (e.g., one of the sample vials) is selected, the system can move that sample to the sampling platform (607) (e.g., using pickup tool 130). In some embodiments, this step is skipped if no sample is selected. For example, no sample is selected if the system is instead running a standard (e.g., high concentration standard 120a, low concentration standard 120c, internal standard 120c) or a blank run.

In some embodiments, the system can move the sampling wand 114 to the sample (608), thereby enabling the system to use the sampling wand 114 to introduce sample to the chemical analyzer 122 (e.g., through a preconcentration system 121 or 206). For example, the system first uses the pickup tool 130 to move the sample to the sampling platform (607) and then uses the pickup tool 130 to move the sampling wand 114 to the sample (608). In some embodiments, if a sample is not being analyzed (e.g., the system is running a standard or performing a blank run), the sampling wand 114 is moved to one of the valves 120a-d to provide the desired gas to the system.

In some embodiments, the system collects the sample using the sampling wand 114 (609). In some embodiments, the sampling wand 114 can introduce the sample to the system without introducing another gas to the system while the sample is being drawn. While the sample, if any, is positioned on the sampling platform 112, the system can move the sampling wand 114 to concentrate a requested volume of one or more of a high or low concentration standard (e.g., 120a or 120b), the internal standard 120c, and the sample, if any. In some embodiments, rather than introducing a sample to the system, the sampling wand 114 can introduce one or more standards to the system without a sample or introduce an inert gas to the system without a sample or one or more standards (e.g., to perform a blank run).

In some embodiments, once the requested sample is provided to the system, the system can remove the sampling wand 114 from the sample (e.g., 610) and place the sampling wand 114 in cradle 115. In some embodiments, cradle 115 is coupled to a vacuum source and placing the sampling wand 114 in the cradle can initiate a process to automatically clean the sampling wand 114.

In some embodiments, the system returns the sample to its respective sampling tray (612). If the system is performing heated analysis, the system can begin to move the next sample (607) to the sampling platform 112 for preheating.

In some embodiments, the system can perform sample preconcentration (614) using one of the preconcentration systems described above. Until GC READY is detected (616), the system can wait (618). Once GC READY is detected (616), the system can inject the sample into the chemical analyzer (620) and analyze the sample with the chemical analyzer (622). In some embodiments, once the sample is injected (620), the system can bake out the preconcentration system to ready it for the next sample.

In some embodiments, when preconcentrator is ready, and while the chemical analysis system is conducting analysis on the sample (622), the system can start preconcentrating the next sample (614).

FIG. 7 illustrates an autosampler system.

Some embodiments of the disclosure are directed to an autosampler system comprising: a sampling platform; an x-axis rail; a y-axis rail; a z-axis rail; a pickup tool coupled to one or more motors configured to traverse the x-axis rail, the y-axis rail, and the z-axis rail, wherein the pickup tool is configured to move a sample container from a sample tray to the sampling platform; a sample wand configured to draw a known mass of a gas sample having a volume in the range of 1-2500 cc from the sample container without addition of another gas into a sample preconcentrator using a mass flow controller or vacuum reservoir, wherein the pickup tool is further configured to move the sample wand to the sample container, and wherein the gas sample is at a pressure that is greater than, less than, or equal to atmospheric pressure while contained in the sample container; and a chemical analysis device fluidly coupled to the sample preconcentrator. Additionally or alternatively, in some embodiments the autosampler system further includes a sampling wand cradle, the sampling wand cradle coupled to a vacuum source such that a vacuum is drawn in the sampling wand while the sampling wand is disposed in the cradle. Additionally or alternatively, in some embodiments the pickup tool is further configured to move the sampling wand between the sampling wand cradle and the sample container. Additionally or alternatively, in some embodiments the autosampler system further comprises one or more valves coupled to one or more gases, wherein the pickup tool is further configured to couple the sample wand to one of the valves to introduce a gas to the chemical analysis device, and wherein the one or more gases include an analyzer calibration gas mixture or a system purge gas. Additionally or alternatively, in some embodiments the autosampler system further includes a clamp by which the sample tray is coupled to the x-axis rail of the autosampler system, wherein the clamp includes one or more magnets in a predetermined arrangement corresponding to the sample tray; a magnet sensor configured to detect the one or more magnets of the clamp; and one or more processors configured to look up calibration information associated with the predetermined arrangement of magnets. Additionally or alternatively, in some embodiments the sample container has an outer diameter in the range of ¼ inch to 5.2 inches.

Some embodiments of the disclosure are directed to a system including a sample container having a volume in the range of 1-2500 cc containing a gas sample at a pressure that is greater than, less than, or equal to atmospheric pressure; and an autosampler system comprising: a sampling platform; an x-axis rail; a y-axis rail; a z-axis rail; a pickup tool coupled to one or more motors configured to traverse the x-axis rail, the y-axis rail, and the z-axis rail, wherein the pickup tool is configured to move a sample container from a sample tray to the sampling platform; and a sample wand configured to draw a known mass of the gas sample from the sample container into a sample preconcentrator without addition of another gas using a mass flow controller or vacuum reservoir, wherein the pickup tool is further configured to move the sample wand to the sample container, and wherein the gas sample is at a pressure that is greater than, less than, or equal to atmospheric pressure while contained in the sample container; and a chemical analysis device fluidly coupled to the sample preconcentrator. Additionally or alternatively, in some embodiments the autosampler system further comprises a sampling wand cradle, the sampling wand cradle coupled to a vacuum source such that a vacuum is drawn in the sampling wand while the sampling wand is disposed in the cradle. Additionally or alternatively, in some embodiments the pickup tool is further configured to move the sampling wand between the sampling wand cradle and the sample container. Additionally or alternatively, in some embodiments the autosampler system further comprises one or more valves coupled to one or more gases, wherein the pickup tool is further configured to couple the sample wand to one of the valves to introduce a gas to the chemical analysis device, and wherein the one or more gases include an analyzer calibration gas mixture or a system purge gas. Additionally or alternatively, in some embodiments the autosampler system further comprises: a clamp by which the sample tray is coupled to the x-axis rail of the autosampler system, wherein the clamp includes one or more magnets in a predetermined arrangement corresponding to the sample tray; a magnet sensor configured to detect the one or more magnets of the clamp; and one or more processors configured to look up calibration information associated with the predetermined arrangement of magnets. Additionally or alternatively, in some embodiments the sample container has an outer diameter in the range of ¼ inch to 5.2 inches.

Some embodiments are directed to a method comprising: moving a sample container from a sample tray to a sampling platform of an autosampler system with a pickup tool of the autosampler system, wherein the autosampler system further includes: an x-axis rail; a y-axis rail; a z-axis rail; and one or more motors coupled to the pickup tool, the one or more motors configured to traverse the x-axis rail, the y-axis rail, and the z-axis rail of the autosampler system, moving, with the pickup tool, a sample wand of the autosampler system to the sample container; drawing, with the sample wand using a mass flow controller or vacuum reservoir, a known mass of a gas sample having a volume in the range of 1-2500 cc from the sample container without addition of another gas, wherein the gas sample is at a pressure that is greater than, less than, or equal to atmospheric pressure while contained in the sample container; and analyzing the gas sample with a chemical analysis device fluidly coupled to the sample preconcentrator. Additionally or alternatively, in some embodiments the method further includes while the sampling wand is disposed in a sampling wand cradle, the sampling wand cradle coupled to a vacuum source: drawing, with the vacuum source, a vacuum in the sampling wand. Additionally or alternatively, in some embodiments the method further includes prior to drawing the vacuum in the sampling wand: moving, with the pickup tool, the sampling wand to the sampling wand cradle. Additionally or alternatively, in some embodiments the method further includes coupling, via the pickup tool, the sampling wand to a valve of one or more valves coupled to one or more gases; and introducing, using the sampling wand, one of the one or more gases coupled to the valve to the chemical analysis device, wherein the one or more gases include an analyzer calibration gas mixture or a system purge gas. Additionally or alternatively, in some embodiments further comprising detecting, using a magnet sensor of the autosampler system, one or more magnets in a predetermined arrangement, the one or more magnets incorporated into a clamp by which the sample tray is coupled to the x-axis rail of the autosampler system; and looking up, with one or more processors of the autosampler system, calibration information associated with the predetermined arrangement of magnets. Additionally or alternatively, in some embodiments the sample container has an outer diameter in the range of ¼ inch to 5.2 inches.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An autosampler system comprising:
a sampling platform;
an x-axis rail;
a y-axis rail;
a z-axis rail;
a pickup tool coupled to one or more motors configured to traverse the x-axis rail, the y-axis rail, and the z-axis rail, wherein the pickup tool is configured to move a sample container from a sample tray to the sampling platform;
a sample wand configured to draw a known mass of a gas sample having a volume in a range of 1-2500 cc from the sample container without addition of another gas into a sample preconcentrator fluidly coupled to the sample wand using a vacuum reservoir, wherein the pickup tool is further configured to move the sample wand to the sample container and wherein the gas sample is at a pressure that is greater than, less than, or equal to atmospheric pressure while contained in the sample container;
a chemical analysis device fluidly coupled to the sample preconcentrator; and
a sampling wand cradle, the sampling wand cradle coupled to a vacuum source such that a vacuum is drawn in the sampling wand while the sampling wand is disposed in the sampling wand cradle.

2. The autosampler system of claim 1, wherein the pickup tool is further configured to move the sampling wand between the sampling wand cradle and the sample container.

3. The autosampler system of claim 1, further comprising one or more valves coupled to one or more gases, wherein the pickup tool is further configured to couple the sample wand to one of the valves to introduce a gas to the chemical analysis device, and wherein the one or more gases include an analyzer calibration gas mixture or a system purge gas.

4. The autosampler system of claim 1, further comprising:
a clamp by which the sample tray is coupled to the x-axis rail of the autosampler system, wherein the clamp includes one or more magnets in a predetermined arrangement corresponding to the sample tray;
a magnet sensor configured to detect the one or more magnets of the clamp; and
one or more processors configured to look up calibration information associated with the predetermined arrangement of magnets.

5. The autosampler system of claim 1, wherein the sample container has an outer diameter in a range of ¼ inch to 5.2 inches.

6. A system comprising:
a sample container having a volume in a range of 1-2500 cc containing a gas sample at a pressure that is greater than, less than, or equal to atmospheric pressure; and
an autosampler system comprising:
a sampling platform;
an x-axis rail;
a y-axis rail;
a z-axis rail;
a pickup tool coupled to one or more motors configured to traverse the x-axis rail, the y-axis rail, and the z-axis rail, wherein the pickup tool is configured to move a sample container from a sample tray to the sampling platform; and
a sample wand configured to draw a known mass of the gas sample from the sample container into a sample preconcentrator fluidly coupled to the sample wand without addition of another gas using a vacuum reservoir, wherein the pickup tool is further configured to move the sample wand to the sample container and wherein the gas sample is at a pressure that is greater than, less than, or equal to atmospheric pressure while contained in the sample container;
a chemical analysis device fluidly coupled to the sample preconcentrator; and
a sampling wand cradle, the sampling wand cradle coupled to a vacuum source such that a vacuum is drawn in the sampling wand while the sampling wand is disposed in the sampling wand cradle.

7. The system of claim 6, wherein the pickup tool is further configured to move the sampling wand between the sampling wand cradle and the sample container.

8. The system of claim 6, wherein the autosampler system further comprises one or more valves coupled to one or more gases, wherein the pickup tool is further configured to couple the sample wand to one of the valves to introduce a gas to the chemical analysis device, and wherein the one or more gases include an analyzer calibration gas mixture or a system purge gas.

9. The system of claim 6, wherein the autosampler system further comprises:
a clamp by which the sample tray is coupled to the x-axis rail of the autosampler system, wherein the clamp includes one or more magnets in a predetermined arrangement corresponding to the sample tray;
a magnet sensor configured to detect the one or more magnets of the clamp; and
one or more processors configured to look up calibration information associated with the predetermined arrangement of magnets.

10. The system of claim 6, wherein the sample container has an outer diameter in a range of ¼ inch to 5.2 inches.

11. A method comprising:
moving a sample container from a sample tray to a sampling platform of an autosampler system with a pickup tool of the autosampler system, wherein the autosampler system further includes:

an x-axis rail;
a y-axis rail;
a z-axis rail; and
one or more motors coupled to the pickup tool, the one or more motors configured to traverse the x-axis rail, the y-axis rail, and the z-axis rail of the autosampler system, moving, with the pickup tool, a sample wand fluidly coupled to a sample preconcentrator of the autosampler system to the sample container;

drawing, with the sample wand using a vacuum reservoir, a known mass of a gas sample having a volume in a range of 1-2500 cc from the sample container without addition of another gas into the sample preconcentrator, wherein the gas sample is at a pressure that is greater than, less than, or equal to atmospheric pressure while contained in the sample container;

analyzing the gas sample with a chemical analysis device fluidly coupled to the sample preconcentrator; and while the sampling wand is disposed in a sampling wand cradle, the sampling wand cradle coupled to a vacuum source, drawing, with the vacuum source, a vacuum in the sampling wand.

12. The method of claim 11, further comprising:
prior to drawing the vacuum in the sampling wand:
moving, with the pickup tool, the sampling wand to the sampling wand cradle.

13. The method of claim 11, further comprising:
coupling, via the pickup tool, the sampling wand to a valve of one or more valves coupled to one or more gases; and
introducing, using the sampling wand, one of the one or more gases coupled to the valve to the chemical analysis device, wherein the one or more gases include an analyzer calibration gas mixture or a system purge gas.

14. The method of claim 11, further comprising:
detecting, using a magnet sensor of the autosampler system, one or more magnets in a predetermined arrangement, the one or more magnets incorporated into a clamp by which the sample tray is coupled to the x-axis rail of the autosampler system; and
looking up, with one or more processors of the autosampler system, calibration information associated with the predetermined arrangement of magnets.

15. The method of claim 11, wherein the sample container has an outer diameter in a range of ¼ inch to 5.2 inches.

* * * * *